(12) United States Patent
Shimizu et al.

(10) Patent No.: US 7,734,638 B2
(45) Date of Patent: *Jun. 8, 2010

(54) FILE SYSTEM UPDATING METADATA OF FILES ACCORDING TO RESULTS OF KEYWORD SEARCH

(75) Inventors: Akira Shimizu, Kokubunji (JP); Takaki Nakamura, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 412 days.

This patent is subject to a terminal disclaimer.

(21) Appl. No.: 11/637,763

(22) Filed: Dec. 13, 2006

(65) Prior Publication Data

US 2007/0088761 A1 Apr. 19, 2007

Related U.S. Application Data

(63) Continuation of application No. 10/879,077, filed on Jun. 30, 2004, now Pat. No. 7,171,431.

(30) Foreign Application Priority Data

Apr. 21, 2004 (JP) .......................... P2004-125319

(51) Int. Cl.
G06F 7/00 (2006.01)
G06F 17/30 (2006.01)
(52) U.S. Cl. .......................... 707/758; 707/706; 707/736
(58) Field of Classification Search ........................ None
See application file for complete search history.

(56) References Cited

U.S. PATENT DOCUMENTS 5,297,042 A 3/1994 Morita

| 5,625,810 A | 4/1997 | Kurosu et al. |
| 5,924,087 A | 7/1999 | Takahashi et al. |
| 6,424,429 B1 | 7/2002 | Takahashi et al. |
| 6,625,335 B1 | 9/2003 | Kanai |

(Continued)

FOREIGN PATENT DOCUMENTS

JP 06-131229 A 5/1994

(Continued)

OTHER PUBLICATIONS

Japanese Office Action dated Jun. 30, 2009, issued in corresponding Japanese Patent Application No. 2004-125319 along with partial English language translation.

*Primary Examiner*—Hosain T Alam
*Assistant Examiner*—Usmaan Saeed
(74) *Attorney, Agent, or Firm*—Brundidge & Stanger, P.C.

(57) ABSTRACT

A file system program that controls a processor to create an attribute information area in which a registered keyword as metadata of the data attached to the file; wherein the file system program comprises: a file access control module that controls access to the file; and a file search module that searches for the file using an inputted keyword, wherein the file search module comprises: an attribute information search module that searches for a file by comparing the registered keyword and the inputted keyword; and an entire document search module that searches for a file by comparing the entire file and the inputted keyword, and wherein the file access control module comprises an. attribute information change module that changes the registered keyword based on a result of the search by the entire document search module.

6 Claims, 12 Drawing Sheets

U.S. PATENT DOCUMENTS

| | | | |
|---|---|---|---|
| 6,832,221 | B2 | 12/2004 | Takahashi |
| 6,883,001 | B2 | 4/2005 | Abe |
| 6,886,005 | B2 * | 4/2005 | Davis .......................... 707/2 |
| 7,003,442 | B1 | 2/2006 | Tsuda |
| 7,054,854 | B1 * | 5/2006 | Hattori et al. ................ 707/3 |
| 7,111,000 | B2 * | 9/2006 | Wen et al. .................... 707/5 |
| 7,260,776 | B2 * | 8/2007 | Moreau et al. ............ 715/234 |
| 2002/0091684 | A1 * | 7/2002 | Nomiyama et al. ........... 707/3 |
| 2002/0169753 | A1 | 11/2002 | Yoshimura et al. |
| 2003/0018626 | A1 * | 1/2003 | Kay et al. ..................... 707/3 |
| 2003/0050927 | A1 * | 3/2003 | Hussam ....................... 707/5 |
| 2003/0177124 | A1 * | 9/2003 | Sauri .......................... 707/10 |
| 2003/0177127 | A1 * | 9/2003 | Goodwin et al. ........... 707/10 |
| 2003/0225866 | A1 * | 12/2003 | Hudson ...................... 709/221 |
| 2004/0006740 | A1 * | 1/2004 | Krohn et al. ............... 715/513 |
| 2004/0019499 | A1 | 1/2004 | Murashita |
| 2004/0220919 | A1 * | 11/2004 | Kobayashi ..................... 707/3 |
| 2004/0249790 | A1 | 12/2004 | Komamura |
| 2005/0044070 | A1 * | 2/2005 | Nagata et al. ................ 707/3 |
| 2005/0108619 | A1 * | 5/2005 | Theall et al. ............... 715/500 |
| 2005/0210008 | A1 * | 9/2005 | Tran et al. .................... 707/3 |
| 2005/0222975 | A1 * | 10/2005 | Nayak et al. ................. 707/3 |
| 2005/0234984 | A1 * | 10/2005 | Rogerson et al. ......... 707/104.1 |

FOREIGN PATENT DOCUMENTS

| | | | |
|---|---|---|---|
| JP | 06-314296 A | | 11/1994 |
| JP | 09-198395 | * | 7/1997 |
| JP | 09-198395 A | | 7/1997 |
| JP | 2002-251410 A | | 9/2002 |

* cited by examiner

FIG.4

METADATA

| ATTRIBUTE NAME | ATTRIBUTE VALUE |
|---|---|
| FILE NAME | patent.doc |
| OWNER | shimizu |
| CREATION TIME | 1999.12.24 23:59:00 |
| KEYWORD | "PATENT", "SEARCH", "METADATA", "SPECIFICATION" |
| IMPORTANT KEYWORD | "XML", "Web" |

FIG.5

OPERATION HISTORY TABLE

| TIME | OPERATION | USER | KEYWORD | FILE NAME | 109 |
|---|---|---|---|---|---|
| 2002.02.02 12:10:00 | search | shimizu | "XML" | | |
| 2002.02.02 12:15:00 | open | shimizu | "XML" | specification.doc | |
| 2002.02.02 12:20:00 | open | shimizu | "XML" | diagram.doc | |
| | | | | | |
| . . . | . . . | . . . | . . . | . . . | |
| 501 | 502 | 503 | 504 | 505 | |

FILE SYSTEM UPDATING METADATA OF FILES ACCORDING TO RESULTS OF KEYWORD SEARCH

CLAIM OF PRIORITY

The present application is a continuation of U.S. patent application Ser. No. 10/879,077 filed on Jun. 30, 2004 now U.S Pat. No. 7,171,431, now allowed and claims priority from Japanese application P2004-125319 filed on Apr. 21, 2004.

BACKGROUND

The present invention relates to a file system of a computer device.

A capacity of magnetic disk devices and other data recording devices for computers increases yearly as technology advances. Furthermore, in recent years, due to legal regulation and the like, there are increasing cases where long-term saving of data is obligatory. As a result, a volume of data processed by computer devices has increased dramatically. In order to facilitate obtaining necessary files from such vast amounts of data, a high-speed and highly functional file search technique is necessary.

As an example of this type of file search technique, a proposal has been made for an information search system which is provided with a document database and a separate dictionary of search keywords, and the dictionary is updated each time a search is executed (JP 6-314926 A). In this information search system, when a user inputs a keyword, another keyword that was previously used in the same search expression as the current keyword is displayed to assist the user in inputting the keyword.

Furthermore, a proposal has been made for a document search device in which keywords are extracted from a document and registered beforehand, and searches using these keywords as objects are performed. When the search fails, a search is performed using the entire document as the object. Furthermore, the keyword registration is updated according to the search results (JP 9-198395 A). According to this document search device, even when the inputted keyword has not been registered, a high-speed search can be performed from the next time using the keyword, which will be registered.

SUMMARY

In the above-mentioned search systems and the like, the document file and the information about the relevant keywords are registered separately. Therefore, even when the document file is moved to another computer system, the relevant keyword information does not move. Thus, when the document file is moved to another computer system, the relevant keyword information cannot be used on the computer system which the document has moved to.

Furthermore, among the keywords relevant to a single file, the keyword that is used to actually obtain that file is more important than the other keywords. However, in the above-mentioned search systems and the like, differences in importance levels of the keywords are not utilized in the search.

According to the present invention, there is provided a file system program for managing a file including a file name and data, recorded on a storage device, the program controls a processor to create an attribute information area in which a registered keyword as metadata of the data attached to the file; wherein the file system program comprises: a file access control module that controls access to the file; and a file search module that searches for the file using an inputted keyword, wherein the file search module comprises: an attribute information search module that searches for a file by comparing the registered keyword and the inputted keyword; and an entire document search module that searches for a file by comparing the entire file and the inputted keyword, and wherein the file access control module comprises an attribute information change module that changes the registered keyword based on a result of the search by the entire document search module.

According to the present invention, even when a file is moved to another computer system, it is still possible to perform the same high-speed keyword searches as before the file was moved.

Furthermore, by reflecting the importance level of the keywords in the search results, the utility to the user can be improved. Also, the importance level of the keywords can be set and changed automatically.

BRIEF DESCRIPTION OF THE DRAWINGS

FIG. 4 is an explanatory diagram of contents of metadata.

FIG. 5 is an explanatory diagram of an operation history table.

DETAILED DESCRIPTION OF THE PREFERRED EMBODIMENTS

Figure 1:
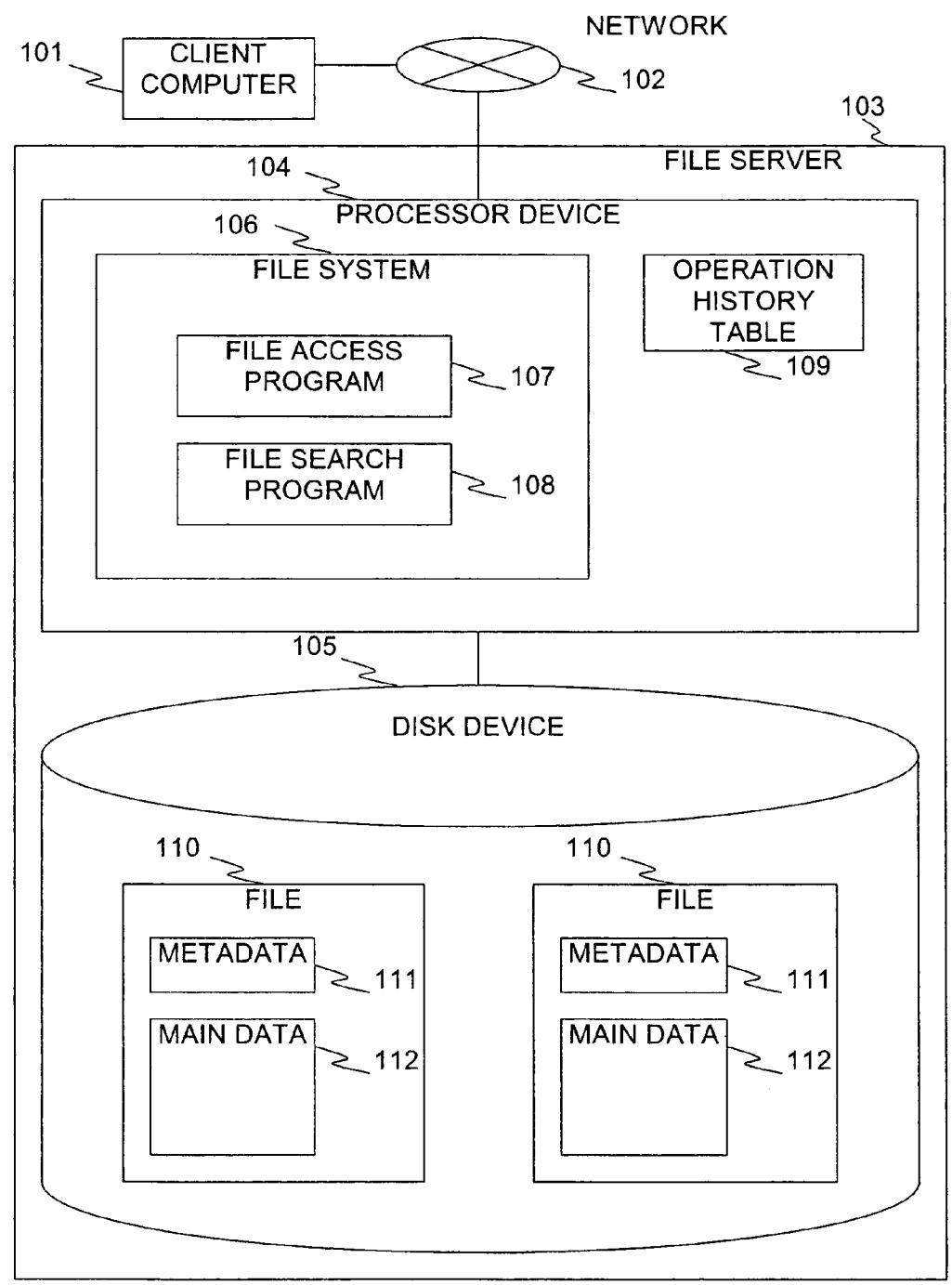
FIG. 1 is a block diagram of a computer system to which a file system according to the present invention is applied.

FIG. 1 is a block diagram showing a computer system to which a file system according to the present invention is applied.

A file server 103 is connected so as to communicate with a client computer 101 via a network 102.

The file server 103 is constituted of a processor device 104 and a disk device 105, and writes and reads data according to requests from the client computer 101.

The processor device 104 is constituted of a CPU (not shown), a memory (not shown), an interface (not shown) for communication with the client computer 101 via the network 102, and the like, deals with data write/read requests from the client computer 101, and manages data recorded in the disk device 105. A memory (not shown) of the processor device 104 records a file system 106 and an operation history table 109 (FIG. 5). The file system 106 is constituted of a file access program 107 (FIG. 2) and a file search program 108 (FIG. 3). Those programs are executed by a CPU (not shown) of the processor device 104.

The disk device 105 is, for example, a magnetic disk device, and may be a single disk drive, or may be a disk array constituted of multiple disk drives.

The disk device 105 records a file 110 that is constituted of a metadata 111 and a main data 112. Here, the main data 112 is data which the client computer 101 requested to be written. Furthermore, the metadata 111 is management information that is added to the main data 112 by the file system 106, and includes keyword information according to the present invention. This keyword information is explained in detail later using FIG. 4.

Figure 2:
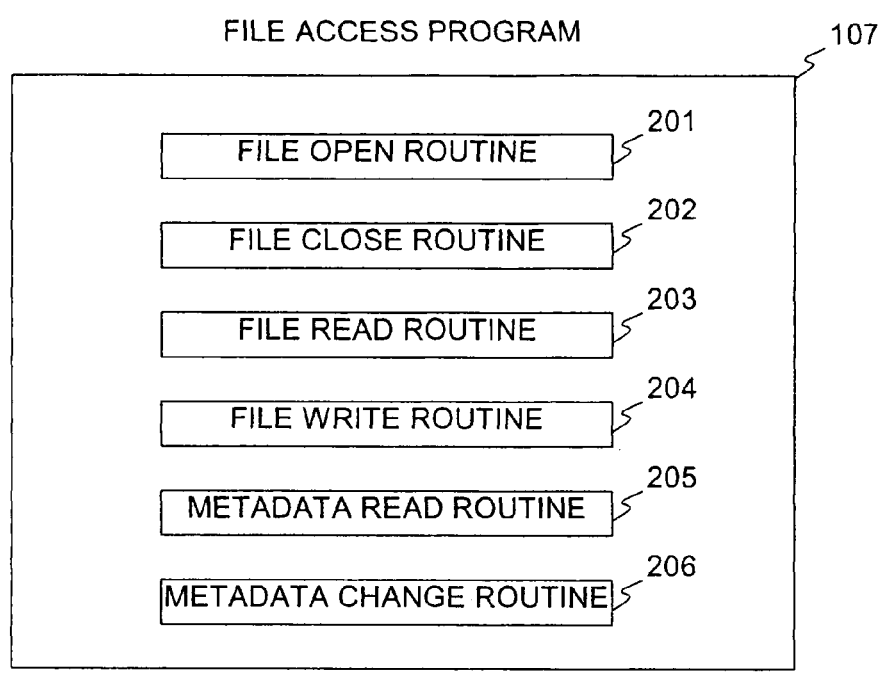
FIG. 2 is an explanatory diagram of a construction of a file access program.
Figure 3:
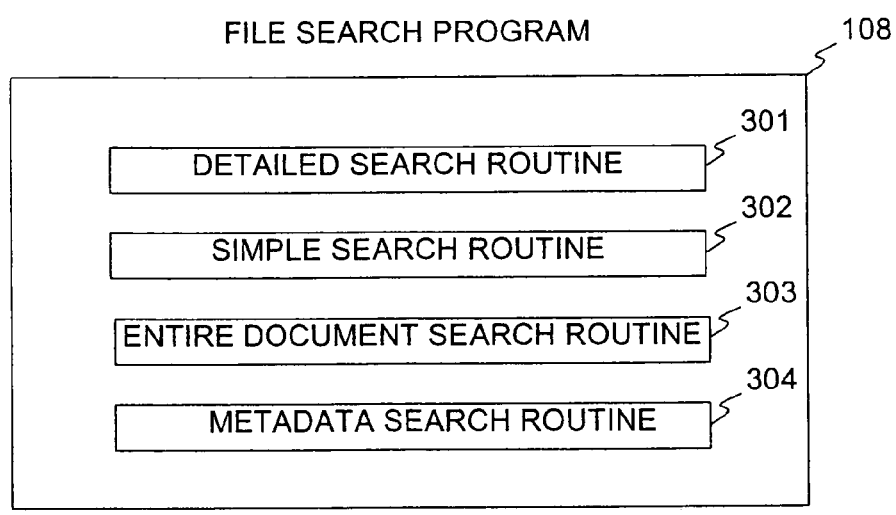
FIG. 3 is an explanatory diagram of a construction of a file search program.

FIG. 2 is an explanatory diagram of a construction of the file access program 107.

The file access program 107 is constituted of a file open routine 201, a file close routine 202, a file read routine 203, a file write routine 204, a metadata read routine 205, and a metadata change routine 206.

Figure 6:
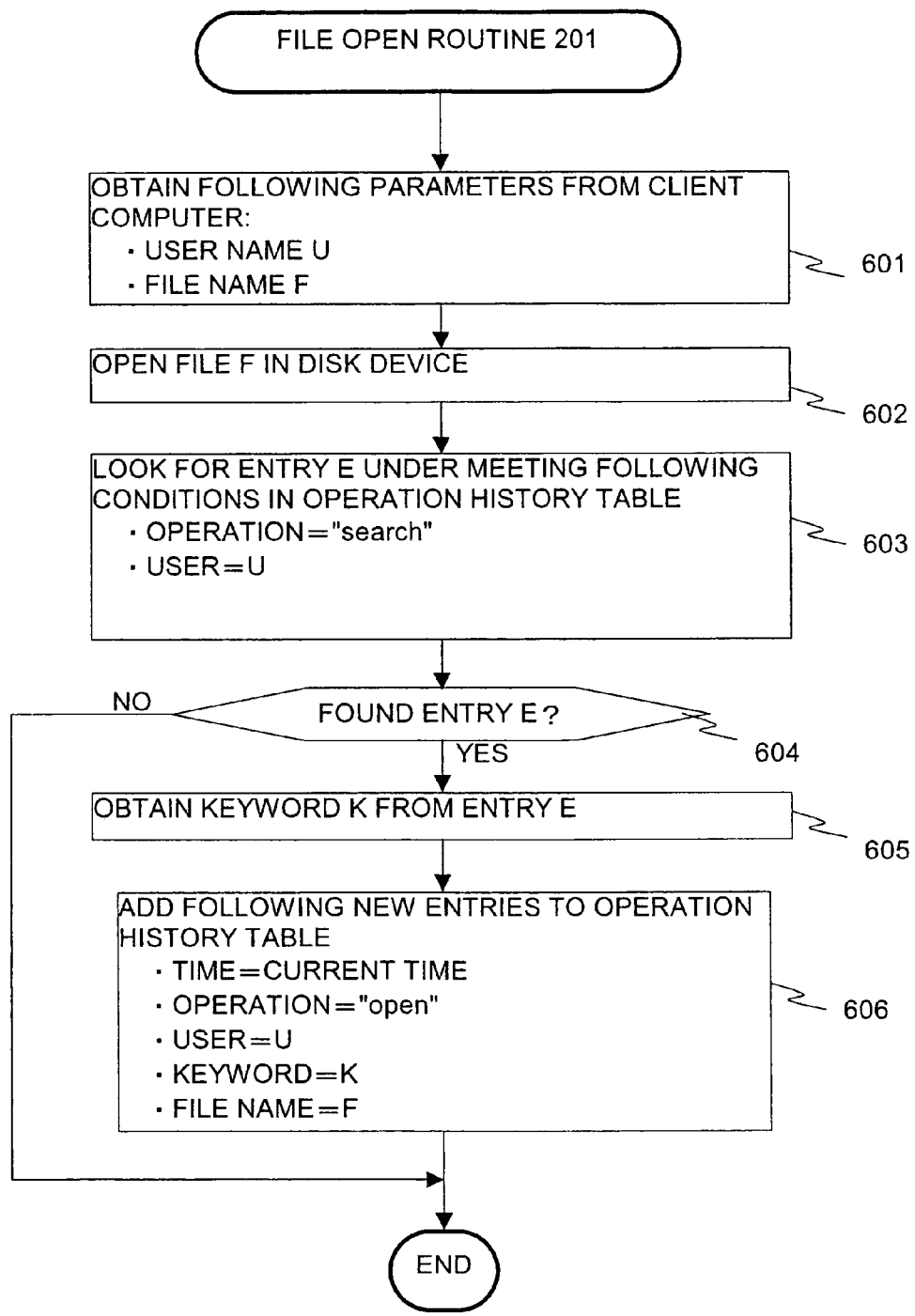
FIG. 6 is a flowchart of a file open routine.
Figure 7:
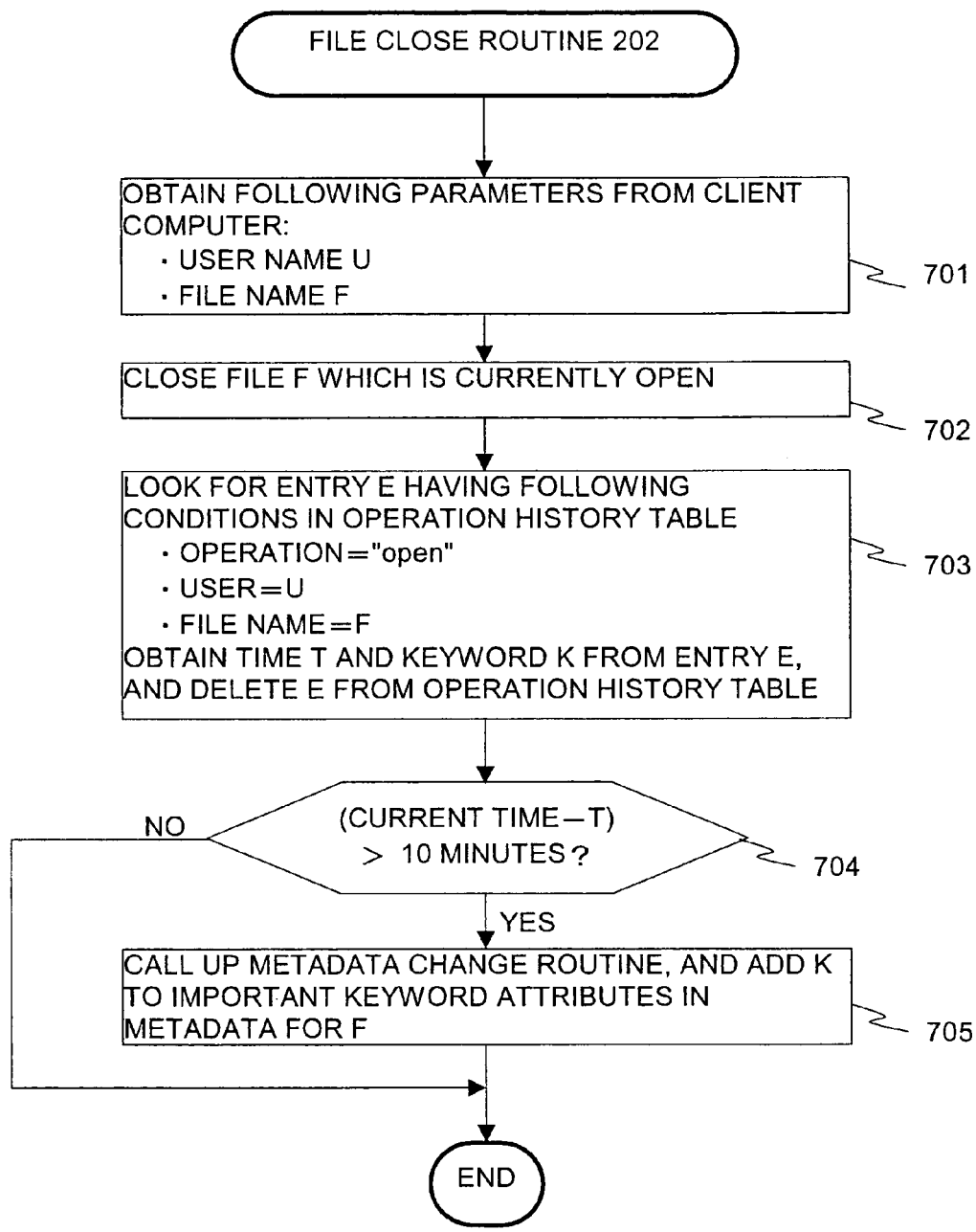
FIG. 7 is a flowchart of a file close routine.

The file open routine 201 and the file close routine 202 are explained in detail using FIG. 6 and FIG. 7, respectively.

Figure 10:
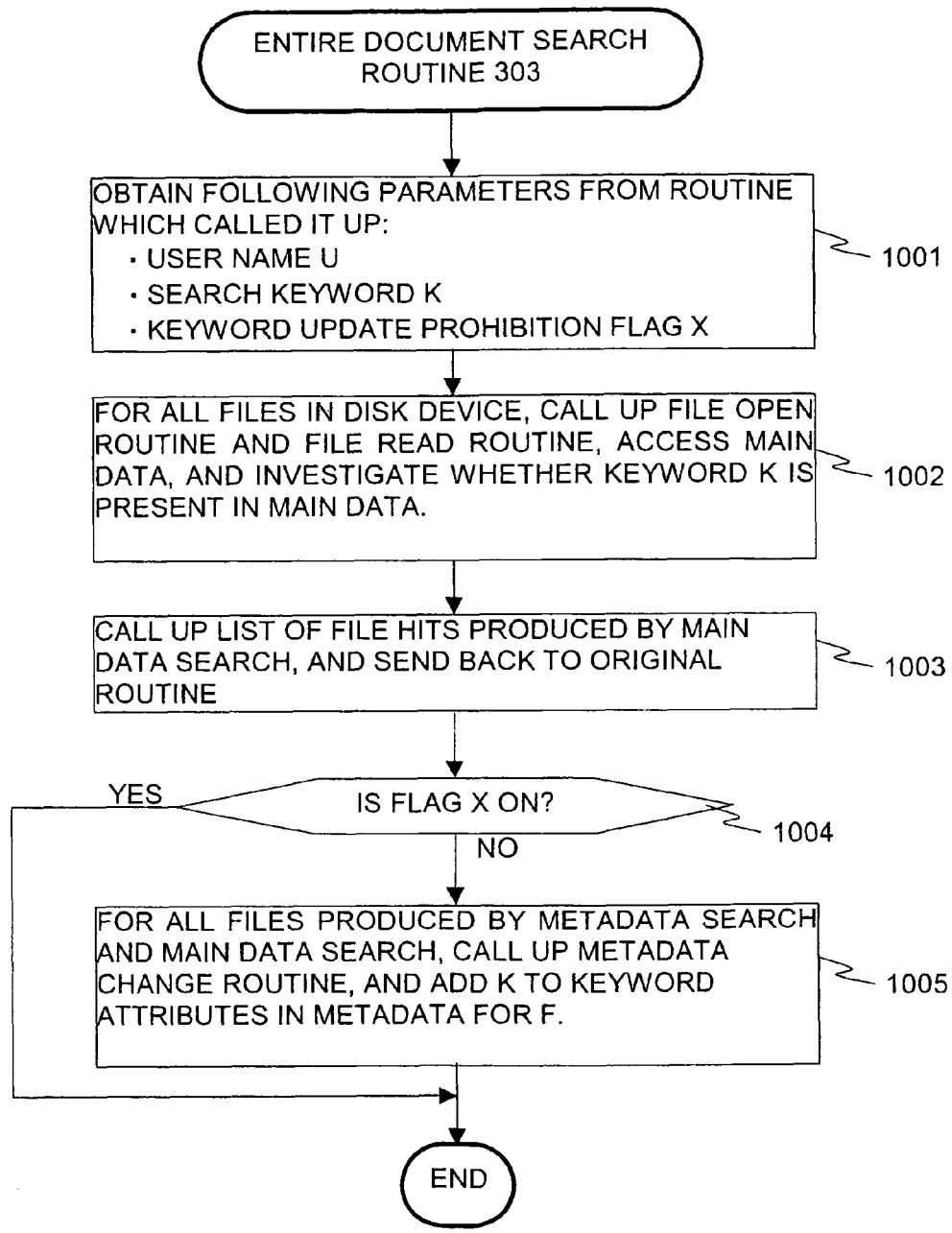
FIG. 10 is a flowchart of an entire document search routine.

Read in the file read routine 203 in response to a read request from the client computer 101, is the file 110 from the disk device 105. Furthermore, the file read routine 203 is also called up from an entire document search routine (FIG. 10).

Written in the file write routine 204 in response to a write request from the client computer 101, is the file 110 into the disk device 105.

The metadata read routine 205 is called up from a metadata search routine (FIG. 11), and reads the content of the metadata 111 of the file 110.

The metadata change routine 206 is called up from the entire document search routine (FIG. 10) and the file close routine 202 (FIG. 7), to rewrite the content of the metadata 111 of the file 110.

FIG. 3 is an explanatory diagram of a construction of the file search program 108.

A file search program 108 is constituted of a detailed search routine 301, a simple search routine 302, an entire document search routine 303, and a metadata search routine 304. These are explained in detail using FIG. 8, FIG. 9, FIG. 10 and FIG. 11 respectively.

FIG. 4 is an explanatory diagram of the content of the metadata 111.

The metadata 111 is constituted of attribute information including a file name 403, an owner 404, a creation time 405, keywords 406, and important keywords 407. Here, attribute names 401 are the names of each attribute, and attribute values 402 are values recorded for each of the attributes.

The file name 403 corresponds to a name of the file 110 that the metadata 111 belongs to. In FIG. 4, the attribute value 402 of the file name 403 is "patent.doc". This means that the name of the file 110 to which the metadata 111 belongs is "patent-.doc".

The owner 404 corresponds to the owner of the file 110 to which the metadata 111 belongs. Here, the owner may refer to the person who requested the file 110 to be written, the person who has access rights to the file 110, or the person who created or changed the main data 112 of the file 110. Furthermore, the attribute value 402 of the owner 404 may be any information that identifies the owner. For example, it may be an ID that is used when the owner accesses the network 102.

The creation time 405 corresponds to the time when the file 110 to which the metadata 111 belongs was created.

The keywords 406 are search keywords that produce the file 110 (i.e., the file 110 is obtained as the result of a search using the search keywords). These are registered by the metadata change routine 206 (FIG. 10). In the example of FIG. 4, "patent" is included in the keywords 406. This means that a search using "patent" as the keyword produces a hit (i.e., the file 110 concerned is included in the files 110 obtained as a result of the search).

Note that when the file 110 is created for the first time, the contents of the keywords 406 or the important keywords 407 of the other files 110 in the disk device 105 are referenced, and when equivalent content is included in the main data 112 of the newly created file 110, the content may be registered in the keywords 406 of the newly created file 110.

Furthermore, the history information on the file 110 (e.g., past names of the file 110, and names of directories where the file 110 was stored in the past) may be registered in the keywords 406 of the file 110.

The important keywords 407 are particularly important among the search keywords that produce the file 110, and these are registered by the file close routine 202 (FIG. 7).

Normally, the objective file 110 is not necessarily included in the files 110 that are obtained as a result of the keyword search. Furthermore, even if it is included, all the files do not necessarily correspond to the objective file 110. In a case where the objective file 110 is included among the results of the search using a given keyword, the keyword is an important keyword for searching the objective file 110. This type of keyword is registered as one of the important keywords 407.

In the example in FIG. 4, "Web" is included in the important keywords 407. This means that when the search is performed using "Web" as the keyword, the file 110 is produced and the file 110 is the objective file.

Note that, whether the file 110 is the objective file may be determined based on whether the user views the file 110 for a predetermined amount of time (e.g., 10 minutes) (FIG. 7). This is because after the search, the file that is viewed for a long time by the user who has performed the search has a high possibility of being the objective file.

Furthermore, it is also possible to have the user him/herself indicate the objective file 110 among the files 110 that have been produced by the search. By inputting his or her instruction, the keywords 406 or the important keywords 407 can be registered just for the objective file 110. For example, a list of files 110 produced by the search can be displayed using a graphical user interface (GUI), and the user can mark a checkbox provided for each file 110 to indicate the objective file 110, and can manipulate (i.e., by a mouse click) an "update" button provided on the screen to input the relevant instructions (not shown).

Furthermore, the registration of the keywords 406 and the important keywords 407 may also be performed manually by the user.

Furthermore, the keywords 406 and the important keywords 407 may be described in XML (eXtensible Markup Language).

Figure 12:
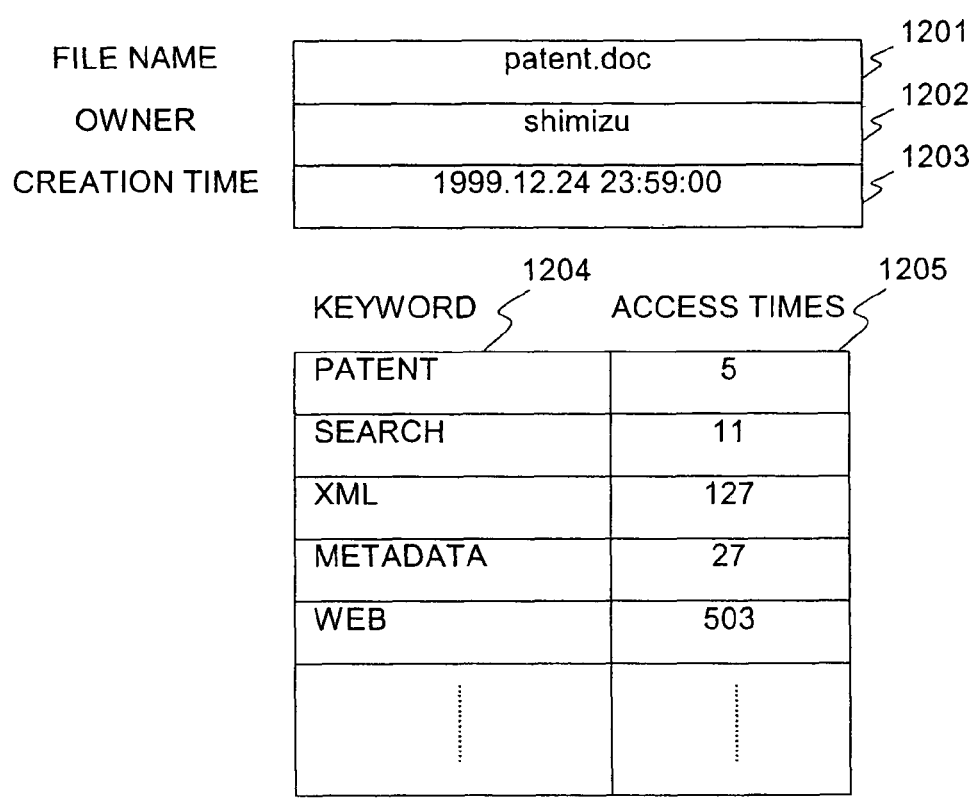
FIG. 12 is an explanatory diagram of access times recording areas.

Another method for registering keywords as metadata of each file, wherein, an accumulated access times of keyword search that has resulted in "hit" by using each keyword is registered as well as the keyword, is also effective. FIG. 12 shows memory areas allocated for metadata of a file in case where the method is employed. Those memory areas are file name recording area 1201, file owner recording area 1202, file creation time recording area 1203, keyword registering area 1204 and access times recording area 1205.

When a keyword search using a keyword result in that the objective file is hit, and when the keyword has not yet been registered in the keyword registering area 1204, the keyword is registered and initial value "one" is recorded in a corresponding row of the access time recording area 1205. When the keyword has been already registered, the content of the corresponding row of the access times recording area 1205 is increased by one. Thus, the accumulated access times of keyword search that has resulted in "hit" by using each keyword is recorded. In case where the value of the recorded access times is larger than a threshold value, the corresponding search keyword can be discriminated as a important keyword. Namely, the search keyword can be utilized as same as the important keyword indicated in F*ig*. 4.

On the other hand, the discrimination of search keywords due to the result of the judgment whether the file extracted by the keyword search is meet to the object of the search or not (explained by referring FIG. 4) can be used together with the discrimination of search keyword by access times (explained by referring FIG. 12).

FIG. 5 is an explanatory diagram of the operation history table 109.

The operation history table 109 is a table recording information about the history of operations previously performed by the user on the file 110. Information about whether the files 110 obtained as a result of the search are viewed by the user who has performed the search, and the time duration for viewing, is obtained and used to judge the importance level of the keywords. The operation history table 109 is referenced by the file open routine 201 and the file close routine 202, and is updated by the file open routine 201, the file close routine 202, and the metadata search routine 304.

The operation history table 109 is used for registration of information by entries. A single entry includes a time 501, a corresponding operation 502, a user 503, a keyword 504, and a file name 505.

The time 501 is the time when the operation 502 is performed.

The operation 502 corresponds to the type of operation performed. "Search" means that a search was performed (FIG. 11), and "open" means that the file 110 was opened (FIG. 6).

The user 503 is the name of the user that has performed the operation 502.

If the operation 502 is "search", then the keyword 504 is the search keyword that has been used for the search. Furthermore, if the operation 502 is "open", then the keyword 504 is the search keyword that has been used in the search that produced the file 110.

The file name 505 is the name of the file 110 that is the object of the operation 502. However, if the operation 502 is "search", then the object file 110 is not specified, so that the file name 505 is empty.

In the example in FIG. 5, on Feb. 2, 2002 at 12:10 (501) the user "shimizu" (503) used "XML" as the keyword (504) to execute a search (502). Then, on Feb. 2, 2002 at 12:15 (501), the same user "shimizu" (503) opened "specification.doc" (505) from the files obtained by the search (502). Furthermore, on Feb. 2, 2002 at 12:20 (501) the same user "shimizu" (503) opened (502) "diagram.doc" (505) from among the files obtained by the search.

Note that the entry where the operation 502. is "search" may be deleted once a certain amount of time has passed since the time 501 in the entry. In this case, the keywords 504 of the entry may be deleted from the keywords 406 of the files 110 that have not been opened even once among the files 110 obtained by the search.

FIG. 6 is a flowchart of the file open routine 201.

The file open routine 201 is a sub-routine for opening the file 110, and is called up by the client computer 101.

When the client computer 101 calls up the file open routine 201, the file open routine 201 obtains a user name U and a file name F from the client computer 101 that has called it up (601).

Next, the file 110 whose file name 403 is F in the disk device 105 is opened (602).

Figure 11:
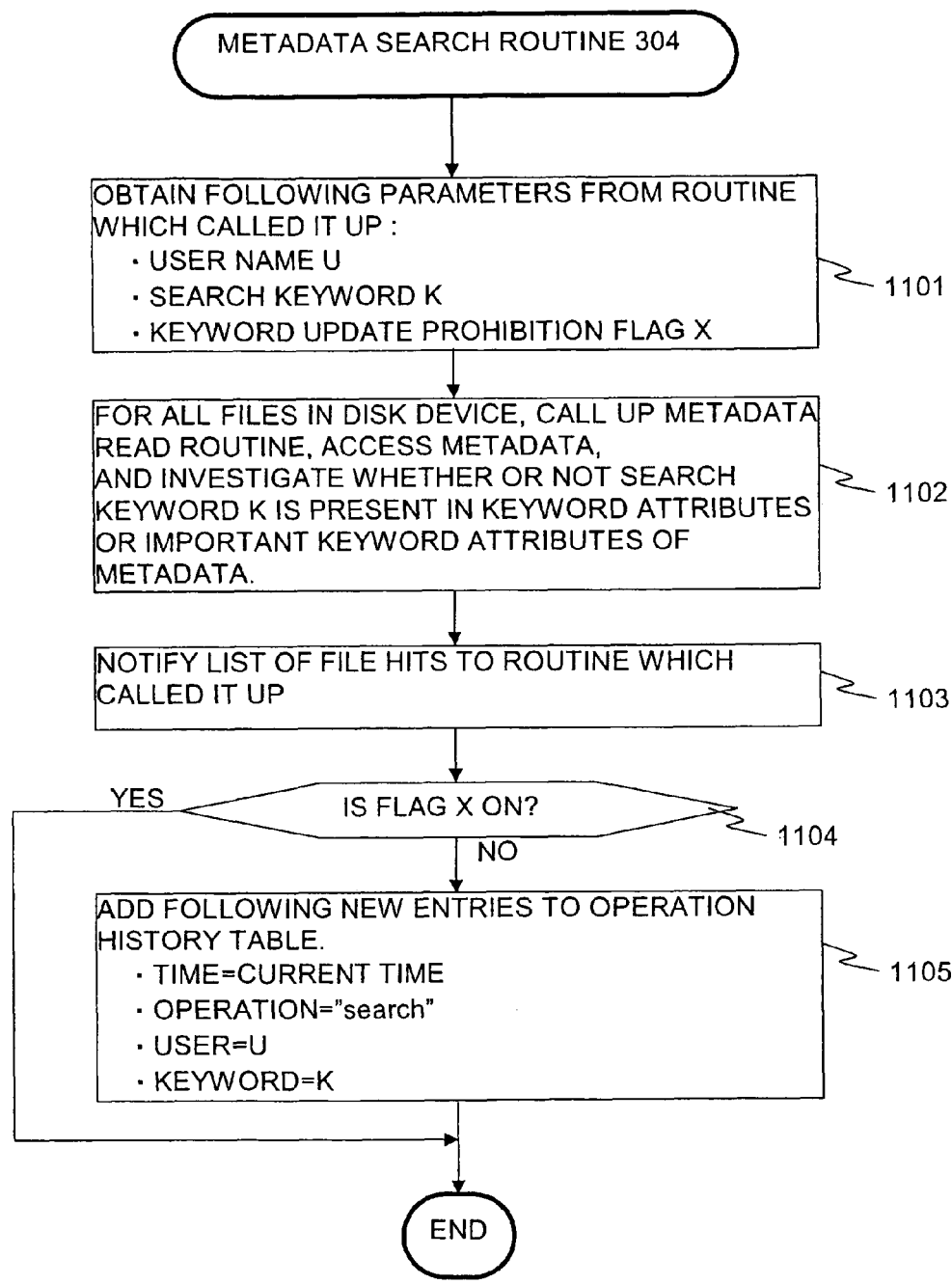
FIG. 11 is a flowchart of a metadata search routine.

Next, the operation history table 109 is searched for the entry E where the operation 502 is "search" and the user 503 is U (603). Note that the entry E where the operation 502 is "search" is registered by the metadata search routine 304 (FIG. 11).

Next, it is determined whether the entry E exists (604). When the entry E does not exist, it is judged that the file 110 is not the file that has been obtained as a result of the search (i.e., the operation for opening the file 110 has been performed independent of the search). Thus, the new entry is not added to the operation history table, and the file open routine 201 ends.

On the other hand, when the entry E does exist, it is judged that the file 110 has been obtained as a result of a search where the user U has used as the keyword 504 of the entry E. Thus, a value K in the keywords 504 of the entry E is obtained (605), the new entry is added to the operation history table 109 (606), and the file open routine 201 ends. In this new entry, the time 501 is the current time, the operation 502 is "open", the user 503 is U, the keyword 504 is K, and the file name 505 is F.

FIG. 7 is a flowchart of the file close routine 202.

The file close routine 202 is a sub-routine for closing the open file 110, and is called up by the client computer 101.

When the client computer 101 calls up the file close routine 202, the file close routine 202 obtains the user name U and the file name F from the client computer 101 that has called it up (701).

Next, the file 110 whose file name 403 is F is closed (702).

Next, the operation history table 109 is searched for the entry E where the operation 502 is "open", the user 503 is U and the file name 505 is F. From this entry E, a value T of the time 501, and a value K of the keyword 504 are obtained, and the entry E is deleted from the operation history table 109.

Next, the time duration from the time T to the current time is calculated and compared against a predetermined time duration (704). In the example in FIG. 7, this predetermined time duration is 10 minutes.

When the time duration from the time T to the current time is not longer than 10 minutes, the time during which the file 110 has been viewed is short, and so it is determined that the file 110 is not the objective file. Thus, the metadata 111 is not changed, and the file close routine 202 ends.

On the other hand, when the time duration from the time T to the current time is longer than 10 minutes, the time during which the file 110 has been viewed was long, and so it is judged that the file 110 is the objective file. Thus, since the keyword K is an important keyword for searching the file 110, the metadata change routine 206 is called up, and the keyword K is added to the attribute value 402 in the important keywords 407 of the metadata 111 in the file 110 (705), and the file close routine 202 ends.

Figure 8:
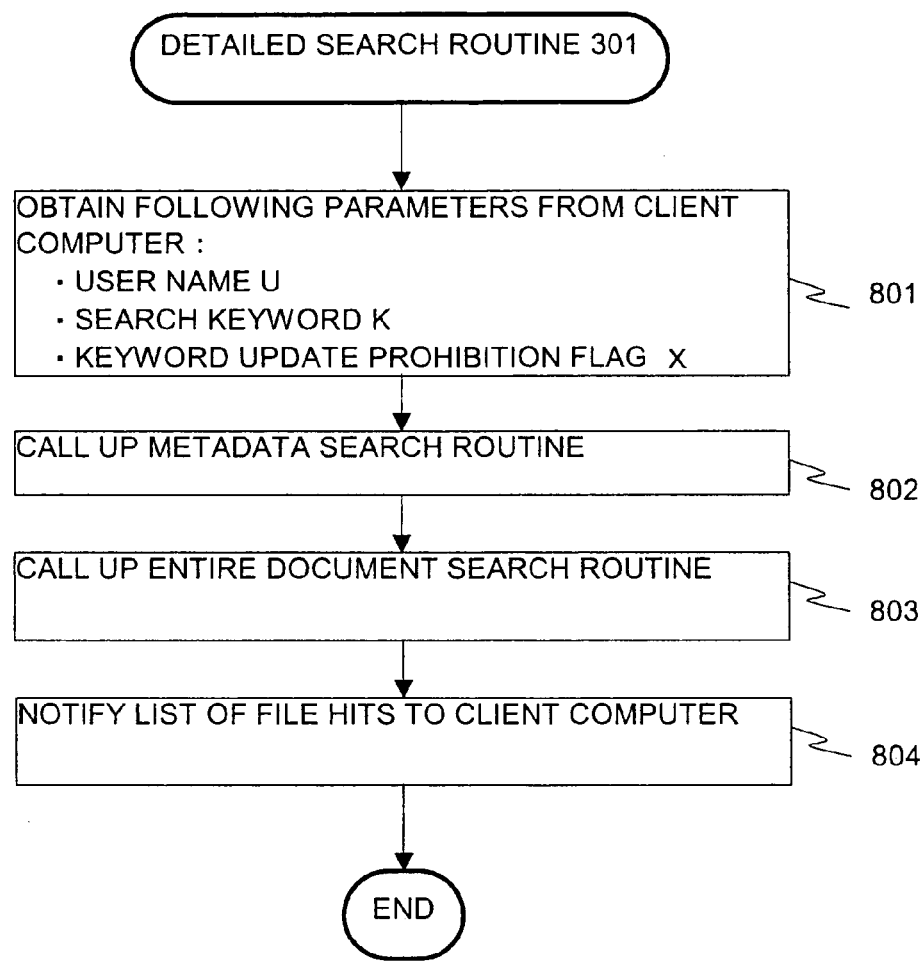
FIG. 8 is a flowchart of a detailed search routine.

FIG. 8 is a flowchart of the detailed search routine 301.

The detailed search routine 301 is a sub-routine for performing a detailed search using the keyword, and is called up by the client computer 101. Specifically, the keyword is used to execute the metadata search routine 304. The entire document search routine 303 is next executed regardless of whether or not the file 110 is not obtained as a result of the search.

When the detailed search routine 301 is called up by the client computer 101, the detailed search routine 301 obtains the user name U, the search keyword K, and a keyword update prohibition flag X from the client computer 101 that has called it up (801).

Next, the metadata search routine 304 is called up, and a search (metadata search) using the search keyword K is performed on the keywords 406 and the important keywords 407 in the metadata 111 (802).

Next, the entire document search routine 303 is called up, and a search using the search keyword K is performed on the main data 112 (803).

Next, a list of the files 110 obtained as the results from executing the metadata search routine 304 and the entire document search routine 303 is returned to the client computer 101 (804).

At this time, the files 110 where the search keyword K is included in the important keywords 407 may be highly placed in the list. This is because the above files 110 have a high possibility of being the file as an object of the search.

In this case, the metadata search routine 304 may first execute a search on just the important keywords 407 and create a list of results from the search, and then attach a list of results from a search on the keywords 406, and a list from executing the entire document search routine 303.

Figure 9:
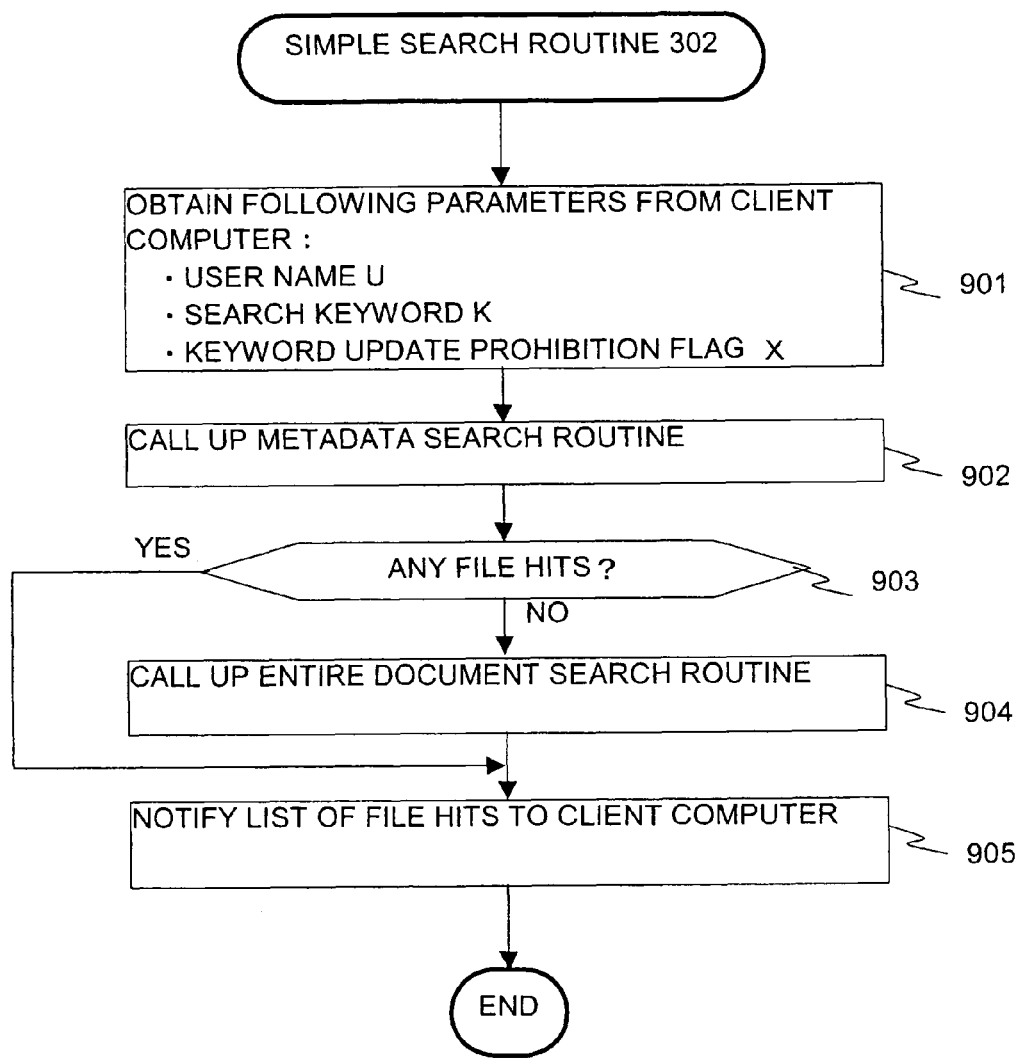
FIG. 9 is a flowchart of a simple search routine.

FIG. 9 is a flowchart of the simple search routine 302.

The simple search routine 302 is a sub-routine for performing a simple search using the keyword, and is called up by the client computer 101. Specifically, the metadata search routine 304 is executed using the keyword. Only when the file 110 is not obtained as a result of the search, the next entire document search routine 303 is executed.

When the client computer 101 calls up the simple search routine 302, the simple search routine 302 obtains the user name U, the search keyword K, and a keyword update prohibition flag X from the client computer 101 that has called it up (901).

Next, the metadata search routine 304 is called up, and a search (metadata search) using the search keyword K is performed on the keywords 406 and the important keywords 407 in the metadata 111 (902). Next, it is determined whether the metadata search (902) has produced the file 110 (903). When the one or more files 110 have been obtained, the entire document search routine 303 is not executed, and the processing advances to step S905.

On the other hand, when the metadata search (902) has not produced even one file 110, the entire document search routine 303 is called up, and a search using the search keyword K is performed on the main data 112 (904).

Next, a list of the files 110 obtained as the results of these searches is returned to the client computer 101 (905).

At this time, the files 110 where the search keyword K is included in the important keywords 407 may be highly placed in the list. This is because the above files 110 have a high possibility of being the file as an object of the search.

In this case, the metadata search routine 304 may first execute a search on just the important keywords 407 and create a list of results from this search, and then attach a list of results from a search on the keywords 406, and a list created by executing the entire document search routine 303.

FIG. 10 is a flowchart of the entire document search routine 303.

The entire document search routine 303 is a sub-routine which executes the keyword search on the main data 112 of the files 110, and returns the search results as a list of files to the routine that has called up the entire document search routine 303. The entire document search routine 303 is called up by the detailed search routine 301 or by the simple search routine 302.

When the detailed search routine 301 or the simple search routine 302 calls up the entire document search routine 303, the entire document search routine 303 obtains the user name U, the search keyword K, and a keyword update prohibition flag X from the routine that has called up the routine (1001).

Here, the keyword update prohibition flag X is a flag provided to protect the user's privacy. When the flag's value is "ON", the keywords 406, the important keywords 407, and the operation history table 109 of the metadata 111 are not updated, regardless of the results of the search.

The value of the keyword update prohibition flag X may be inputted by displaying, on a user's operation screen (not shown), a dialogue box that asks whether or not to update the keywords 406 and the like, and letting the user input the value.

Next, the file open routine 201 and the file read routine 203 are called up, the main data 112 is accessed, and all the files 110 in the disk device 105 are investigated as to whether the search keyword K is included in the main data 112 (1002).

Next, a list is created of the files 110 produced by the main data 112 search (i.e., the files 110 that contain the search keyword K in the main data 112), and this list is returned to the routine that has called up the main data search routine 303 (1003).

Next, it is determined whether or not the flag X is "ON" (1004). When the flag is "ON", the main data search routine 303 ends.

On the other hand, when the flag X is not "ON", the metadata change routine 206 is called up, and the search keyword K is added to the attribute values 402 of the keywords 406 in the metadata 111 of each of all the files 110 produced by the search performed on the main data 112 (1005), and then the entire document search routine 303 ends.

FIG. 11 is a flowchart of the metadata search routine 304.

The metadata search routine 304 is a sub-routine which executes the keyword search on the metadata 111 of the files 110, and returns the search results as a list of files to the routine that has called it up. The metadata search routine 304 is called up by the detailed search routine 301 or by the simple search routine 302.

When the detailed search routine 301 or the simple search routine 302 calls up the metadata search routine 304, the metadata search routine 304 obtains the user name U, the search keyword K, and the keyword update prohibition flag X from the routine that has called up the metadata search routine 304 (1101).

Next, the metadata read routine 205 is called up and the metadata 111 of all the files 110 in the disk device 105 is accessed and investigated as to whether or not the search keyword K is included in the attribute values 402 of the keywords 406 or the important keywords 407 in the metadata 111 (1102).

Next, a list is created of the files 110 produced by the metadata 111 search (i.e., the files 110 that contain the search keyword K in the attribute values 402 of the keywords 406 or the important keywords 407 in the metadata 111), and this list is returned to the routine that has called up the metadata search routine 304 (1103).

At this time, the files 110 that contain the search keyword K in the important keywords 407 may be highly placed in the list. This is because the above files 110 have a high possibility of being the files as an object of the search.

In this case, the metadata search routine 304 may first execute the search on just the important keywords 407 and create a list of the search results, and then add a list of results from searching the keywords 406.

Next, it is determined whether the flag X is "ON" (1104). When the flag is "ON", the metadata search routine 304 ends.

On the other hand, when the flag X is not "ON", a new entry is added to the operation history table 109 (1105), and the metadata search routine 304 ends. In this new entry, the time 501 is the current time, the operation 502 is "search", the user 503 is U, and the keyword 504 is K. However, in a case where the operation history table 109 has an entry where the operation 502 is "search", the user 503 is U, and the keyword 504 is K, the time 501 of the entry is updated to the current time.

According to the present invention, each file has metadata, and the metadata contains the keyword information for searching the file, so the high-speed keyword search on the metadata can be achieved. Furthermore, when the file is moved to another computer system, the keyword information also moves together with the file. Therefore, even after the file is moved, the high-speed keyword search can still be performed similarly to before the file is moved.

Furthermore, among the files obtained as the results of the searches, the keyword used for the search is registered as an important keyword in the metadata of the objective file only, and files produced by searches using the important keyword are displayed while ranking high in the search results, thus improving the utility to the user. Moreover, the registration of the important keywords can be performed automatically based on, for example, the duration of time during which the user has viewed the file.

Furthermore, when the user makes a selection that keyword information or the like is not updated, no information will be left regarding when the user has accessed which file, etc., thus protecting the privacy of the user.

Note that in the above-mentioned embodiment, an example in which the present invention is applied to a file system is described, but the present invention can also be applied to a document management system, a storage system, etc.

In a case where the present invention is applied to a document management system, the above-mentioned file search program 108, the metadata read routine 205, and the metadata change routine 206 are provided. In this case, the files 110 in FIG. 1 correspond to the documents to be managed containing the metadata 111 and the main data 112. The metadata read routine 205 reads the metadata 111, the metadata change routine 206 changes the metadata 111, and the file search program 108 is used to execute searches on the documents.

In a case where the present invention is applied to a storage device, the above-mentioned file system and the operation history table are provided. In this case, the file server 103 shown in FIG. 1 is the storage device to which the present invention is applied.

The present invention can be used in an operating system or in a database file system, and contributes to the realization of high-speed and high-utility searches.

While the present invention has been described in detail and pictorially in the accompanying drawings, the present invention is not limited to such detail but covers various obvious modifications and equivalent arrangements, which fall within the purview of the appended claims.

What is claimed is:

1. An XML document management system, which manages XML documents recorded on a storage device, comprising:
   a processor;
   a document access control unit operative on the processor for controlling access to the XML document; and
   a document search unit operative on the processor for searching the XML documents using an input keyword,
   wherein the document search unit comprises:
      an attribute information search unit that searches by comparing a registered keyword stored in an attribute information area as metadata attached to the XML document, and the input keyword; and
      an entire document search unit that searches by comparing the entire XML document and the input keyword,
   wherein the document access control unit comprises an attribute information change unit that changes the registered keyword based on a result of the search by the entire document search unit,
   wherein the document access control unit detects a period during which the XML document obtained as the result of the search by the entire document search unit is opened, and the attribute information change unit stores the input keyword as an important registered keyword into the attribute information area of the XML document that detected period of which exceeds a predetermined period,
   wherein if a user does not specify update prohibition, the attribute information change unit updates the attribute information area, and
   wherein if the user specifies the update prohibition, the attribute change unit does not update the attribute information area.

2. The XML document management system according to claim 1, wherein the attribute information change unit stores the input keyword as the registered keyword into the attribute information area of the XML document obtained as the result of the search by the entire document search unit.

3. The XML document management system according to claim 1, wherein, in the document search unit, the attribute information search unit searches by comparing the registered keyword and the input keyword, and then the entire document search unit searches by comparing the entire document and the input keyword.

4. The XML document management system according to claim 1, wherein, in the document search unit, the attribute information search unit searches by comparing the registered keyword and the input keyword, and when the XML document is not obtained thereby, the entire document search unit searches by comparing the entire document and the input keyword.

5. The XML document management system according to claim 1, wherein, among the XML documents obtained as the result of the search, the document search unit outputs as search results the XML document which has in the attribute information area the same important registered keyword as the keyword input in the search, prior to outputting the other XML documents.

6. A storage system comprising:
   an interface for communicating with a client computer via a network;
   a processor; and
   a disk device,
   wherein the disk device records one or more files including a file name, data, and an attribute information area in which a registered keyword as metadata of the data is registered,
   wherein the one or more files is written in XML,
   wherein the processor comprises:
   a file access control unit that controls access to the one or more files; and
   a file search unit that searches the one or more files,
   wherein the file search unit comprises:
   an attribute information search unit that searches a file of the one or more files by comparing the registered keyword and an input keyword when a keyword to be used in the file search is input; and
   an entire document search unit that searches by comparing the entire file and the input keyword,
   wherein when the search by the attribute information search unit cannot produce the file, the search by the entire document search unit is performed,
   wherein the file access control unit comprises an attribute information change unit that stores the input keyword as the registered keyword into the attribute information area the file obtained as a result of the search by the entire document search unit, and stores the input keyword as an important registered keyword into the attribute information area of the file which is opened for a period more than a predetermined period among the files obtained as the result of the search by the entire document search unit, the period being detected by the file access control unit, and wherein among the files obtained as the result of the search, the file search unit outputs as a search result the file which has in the attribute information area the same important registered keyword as the keyword input in the search, prior to outputting the other files.

* * * * *